US009387893B2

(12) United States Patent
Steiner et al.

(10) Patent No.: US 9,387,893 B2
(45) Date of Patent: Jul. 12, 2016

(54) SOUND SUPPRESSED IDLER WHEEL ASSEMBLY

(71) Applicant: Caterpillar Inc., Peoria, IL (US)

(72) Inventors: Kevin L. Steiner, Tremont, IL (US); Daniel I. Knobloch, Morton, IL (US); Robert A. Eissler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 11 days.

(21) Appl. No.: 14/505,806

(22) Filed: Oct. 3, 2014

(65) Prior Publication Data

US 2016/0096564 A1 Apr. 7, 2016

(51) Int. Cl.
*B60C 7/10* (2006.01)
*B62D 55/14* (2006.01)
*B62D 55/32* (2006.01)

(52) U.S. Cl.
CPC .............. *B62D 55/14* (2013.01); *B62D 55/32* (2013.01)

(58) Field of Classification Search
CPC .................................................... B62D 55/145
USPC ................................................. 305/136, 137
See application file for complete search history.

(56) References Cited

U.S. PATENT DOCUMENTS

| | | | | |
|---|---|---|---|---|
| 2,830,637 A * | 4/1958 | Deuring | ................... | B60B 9/12 152/49 |
| 3,689,122 A * | 9/1972 | Mazzarins | ............. | B62D 55/15 152/49 |
| 4,818,041 A * | 4/1989 | Oertley | ................ | B62D 55/145 295/20 |
| 5,022,718 A * | 6/1991 | Diekevers | .............. | B62D 55/14 295/11 |
| 5,040,855 A * | 8/1991 | Diekevers | .............. | B62D 55/14 305/137 |
| 5,171,074 A * | 12/1992 | Seksaria | ................. | B60B 3/042 301/64.304 |
| 5,207,489 A * | 5/1993 | Miller | ................. | B62D 55/145 295/7 |
| 6,012,784 A * | 1/2000 | Oertley | .............. | B60B 17/0034 305/136 |
| 6,280,009 B1 * | 8/2001 | Oertley | ............. | B62D 55/0966 305/136 |
| 6,416,142 B1 * | 7/2002 | Oertley | ............. | B62D 55/0966 305/137 |
| 6,631,961 B1 * | 10/2003 | Bedford | ............... | B62D 55/145 305/100 |
| 6,652,043 B2 * | 11/2003 | Oertley | ............. | B62D 55/0963 305/125 |
| 7,905,559 B2 * | 3/2011 | Angot | ................ | B62D 55/0966 305/137 |

(Continued)

FOREIGN PATENT DOCUMENTS

GB 469722 7/1937

OTHER PUBLICATIONS

"Hunter Valley Tracks"; last accessed on Oct. 3, 2014, http://huntervalleytracks.net.au/sound-surpressed-idlers; 1 page.

*Primary Examiner* — Jeffrey J Restifo
(74) *Attorney, Agent, or Firm* — Finnegan, Henderson, Farabow, Garrett & Dunner, LLP

(57) ABSTRACT

An idler wheel assembly for a mobile machine is disclosed. The idler wheel assembly may have an idler body defining a cavity between a hub portion and a rim portion. The idler wheel assembly may also have a sound suppression device. The sound suppression device may have a first side plate attached to the idler body and enclosing at least a portion of the cavity to form a closed space, and a second side plate attached to the idler body. The sound suppression device may further have a dampening member disposed between the first side plate and the second side plate, and dampening material positioned inside the closed space and in contact with a surface of an inner portion of the rim portion.

20 Claims, 4 Drawing Sheets

(56) References Cited

U.S. PATENT DOCUMENTS

| | | | |
|---|---|---|---|
| 8,770,677 B2* | 7/2014 | Yelistratov | B62D 55/14 305/137 |
| 2010/0133898 A1* | 6/2010 | Johannsen | B62D 55/0966 305/137 |
| 2010/0141026 A1* | 6/2010 | Angot | B62D 55/0966 305/137 |
| 2012/0153713 A1* | 6/2012 | Yelistratov | B62D 55/145 305/137 |
| 2012/0153714 A1* | 6/2012 | Yelistratov | B62D 55/145 305/137 |
| 2013/0020860 A1* | 1/2013 | Braun | B62D 55/0966 305/199 |
| 2014/0091615 A1* | 4/2014 | Knobloch | B62D 55/14 305/136 |
| 2014/0091616 A1* | 4/2014 | Xavier | B62D 55/14 305/136 |

* cited by examiner

SOUND SUPPRESSED IDLER WHEEL ASSEMBLY

TECHNICAL FIELD

The present disclosure is directed to an idler wheel assembly and, more particularly, to a sound suppressed idler wheel assembly.

BACKGROUND

Mobile machines, such as earthmoving and construction vehicles, often include a large undercarriage assembly for support and movement. The undercarriage assembly may include several components, such as an endless track, a drive mechanism, rollers, and idlers, that contact and move relative to each other to propel the machine. This relative movement and the resulting vibrations, however, cause the undercarriage assembly to be undesirably noisy. For example, metal track links may directly contact metal tread portions of an idler wheel, creating metal-on-metal contact and vibration that produces loud noise during operation of the associated machine.

In order to help reduce the amount of noise produced by an undercarriage assembly, various sound suppression devices have been implemented. For example, U.S. Pat. No. 3,127,211 (the '211 patent) issued to Kordes et al. on Mar. 31, 1964, discloses a wheel assembly that employs an elastic member placed between a rim and a wheel body. In particular, the '211 patent describes a rail vehicle wheel with an elastically supported rim in which two annular elastic inserts may be provided between the wheel body and the rim.

Although the rail vehicle wheel of the '211 patent may provide some dampening of vibration and noise by employing elastic inserts, the arrangement in the '211 patent may have limitations. For example, forces exerted by the rim on the elastic inserts may be so great as to repeatedly compress the elastic inserts beyond their elastic limit. This may lead to early failure of the elastic inserts. Also, the arrangement of the rim relative to the elastic inserts and the wheel body may cause the elastic inserts of the '211 patent to potentially experience both tension and compression and incur destructive shear forces under side loading.

Another attempt to help dampen vibration of a wheel includes a ring-shaped flange that is attached to an outer edge of an idler wheel assembly. The ring-shaped flange encloses a space near the outer diameter of the idler wheel, which may be filled with tar. While this construction may help dampen some vibration, it may be less than ideal. In particular, there is room for improvement to the overall dampening and noise reduction produced by this design. For example, the use of a single dampening material may allow some noise to easily propagate through the device.

The present disclosure is directed to overcoming one or more of the problems set forth above and/or other problems of the prior art.

SUMMARY

In one aspect, the present disclosure is directed to an idler wheel assembly for a mobile machine. The idler wheel assembly may include an idler body defining a cavity between a hub portion and a rim portion. The idler wheel assembly may also include a sound suppression device. The sound suppression device may include a first side plate attached to the idler body and enclosing at least a portion of the cavity to form a closed space, and a second side plate attached to the idler body. The sound suppression device may further include a dampening member disposed between the first side plate and the second side plate, and dampening material positioned inside the closed space and in contact with a surface of an inner portion of the rim portion.

In another aspect, the present disclosure is directed to a method of installing a sound suppression device on an idler wheel. The idler wheel may include an idler body defining a cavity between a hub portion and a rim portion. The method may include providing a dampening material to fill at least a portion of the cavity, and attaching a first side plate to the idler body to enclose at least a portion of the cavity to form a closed space. The method may further include positioning a dampening member on a side of the first side plate opposite from the closed space. The method may also include attaching a second side plate to the idler body such that the dampening member is disposed between the first side plate and the second side plate.

In yet another aspect, an idler wheel assembly for a mobile machine is disclosed. The idler wheel assembly may include an idler body defining a cavity between a hub portion and a rim portion. The idler wheel assembly may also include a sound suppression device. The sound suppression device may include a first side plate welded to the idler body and enclosing at least a portion of the cavity to form a closed space, the first side plate including a fill hole. The sound suppression device may further include a second side plate welded to the idler body. The sound suppression device may also include a dampening member disposed between the first side plate and the second side plate, and dampening material positioned inside the closed space and in contact with a surface of an inner portion of the rim portion. The dampening material may be a flowable material configured to be provided through the fill hole into the closed space while the first side plate is attached to the idler body.

DETAILED DESCRIPTION

Figure 1:
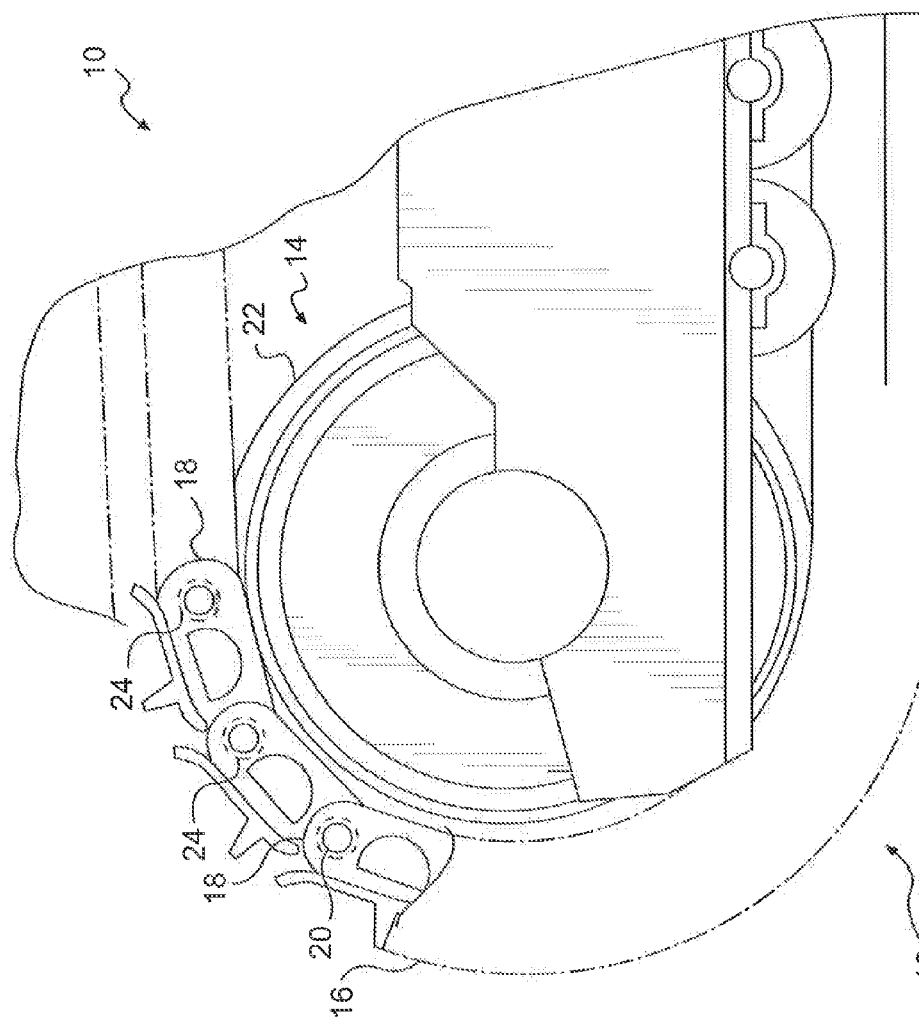
FIG. 1 illustrates a portion of a mobile machine having an idler wheel assembly according to a disclosed embodiment.

FIG. 1 is a partial view of a mobile machine 10, including a portion of a track assembly 12 associated with the mobile machine. Mobile machine 10 may be any of various mobile machines that employ track assemblies for ground transportation and/or for mobility during machine operation. For example, mobile machine 10 may be a track-type tractor, a tracked loader, a hydraulic excavator, or any other mobile machine. Track assembly 12 may include an idler assembly 14 cooperating with track 16 of track assembly 12. While only a portion of track assembly 12 is illustrated in FIG. 1, it will be understood that, in addition to idler assembly 14, a drive sprocket (not shown) and one or more other idler assemblies (also not shown), and other generally conventional track assembly components, may be associated with track assembly 12.

Track 16 may include a plurality of track links 18 connected by transverse track pins 20 and forming an endless loop about idler assembly 14, the drive sprocket, and any other idler assemblies that may be associated with the track assembly. Idler assembly 14 may include an outer peripheral surface 22 configured to engage track links 18, although other configurations are possible, such as engagement with track bushings 24 that may be associated with track pins 20. During operation, the drive sprocket may be driven by a power source (e.g., an engine) to engage track links 18 (e.g., via track pins 20) and cause movement of the track. Track bushings 24 may similarly engage track pins 20 to guide the track as it moves around the loop.

Figure 2:
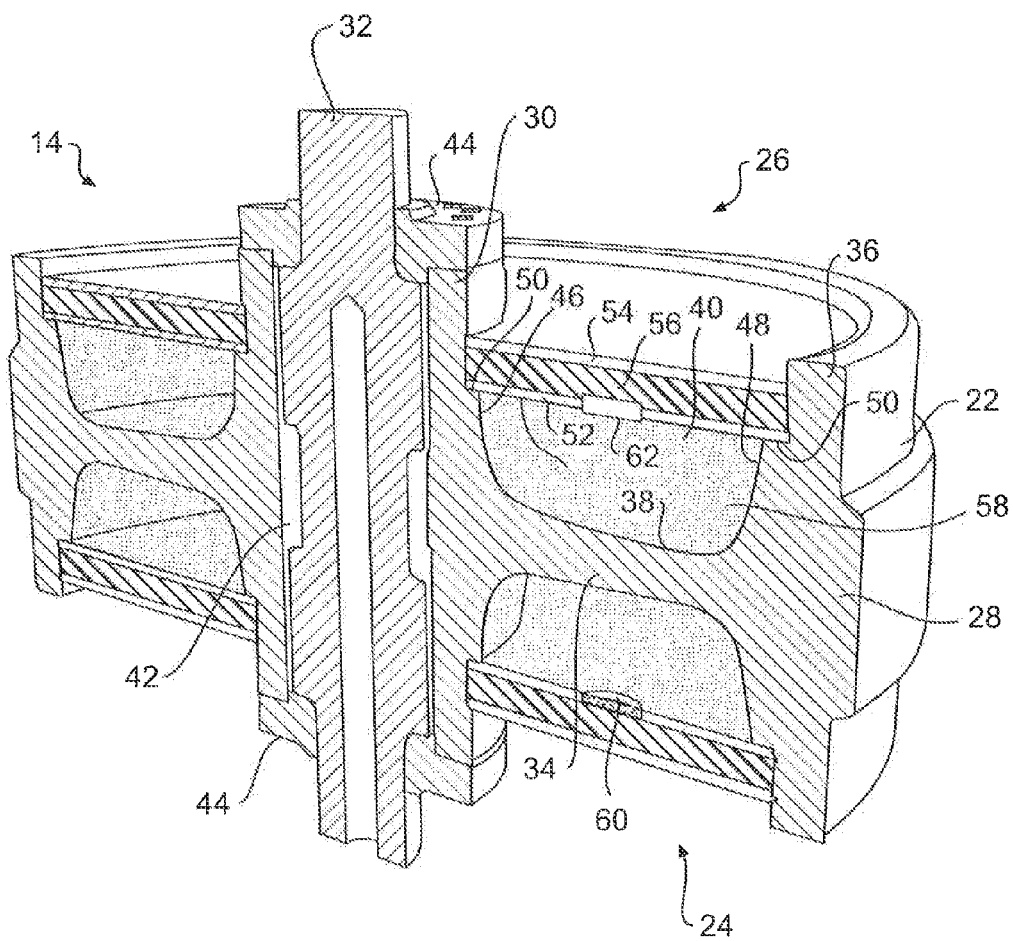
FIG. 2 is a partial cross-sectional view in perspective of an idler wheel assembly including a sound suppression device, according to a disclosed embodiment.
Figure 3:
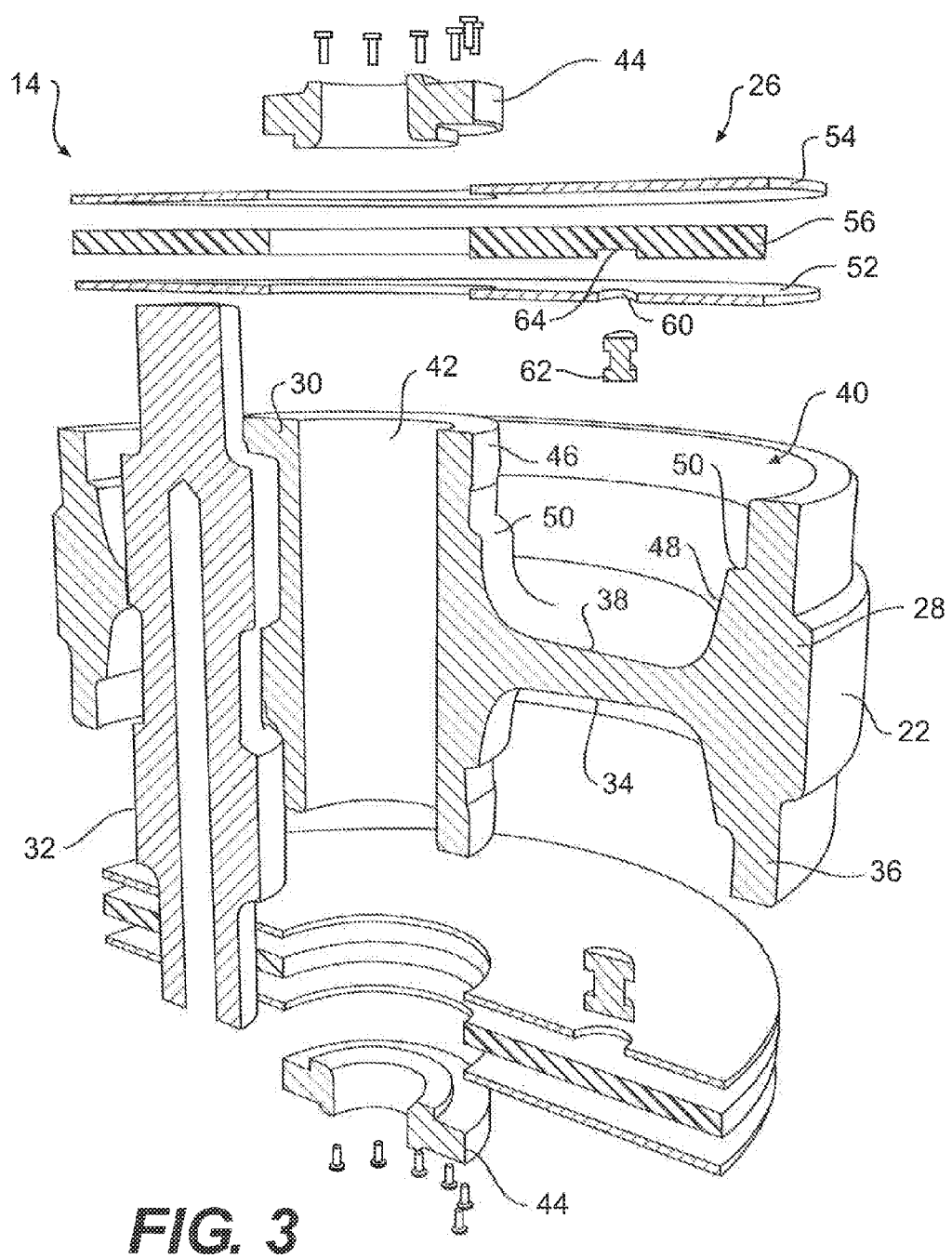
FIG. 3 illustrates an exploded cross-sectional view in perspective of the idler wheel assembly of FIG. 2.

FIG. 2 illustrates a cross-sectional perspective view of idler assembly 14, including a sound suppression device 26. FIG. 3 illustrates another cross-sectional perspective view of idler assembly 14, with several components in exploded positions. With reference to FIGS. 2 and 3, idler assembly 14 may include a circular idler body 28. Idler body 28 may include a hub portion 30 configured to be positioned about an axle 32 for rotation, a central flange 34, and a rim portion 36 adjacent the outer circumference of idler body 28. Idler body 28 may be substantially symmetrical, including a pair of inner surfaces 38 on opposing sides of idler body 28. Inner surfaces 38 may extend from hub portion 30 to rim portion 36, following the contours created by the varying diameters of idler body 28 and creating a pair of ring-shaped cavities 40 on the sides of idler body 28.

Hub portion 30 may include a center cavity 42 configured to receive axle 32, which may be held in place by a pair of opposing securing members 44. Hub portion 30 may also include an outer portion 46 that defines an inner diameter of each cavity 40 and transitions into central flange 34. Flange 34 may transition into rim portion 36, which may include an inner portion 48 that defines an outer diameter of each cavity 40. Rim portion 36 may also include outer peripheral surface 22 at its outer diameter configured to engage track links 18 or track bushings 24 associated with track pins 20, depending on the configuration of idler assembly 14. In an exemplary embodiment, inner surfaces 38 may include a pair of support flanges 50 configured to support one or more components of sound suppression device 26 on idler body 28 and facilitate connection thereto, as will be described in more detail.

In an exemplary embodiment, hub portion 30, central flange 34, and rim portion 36 may be integrally formed. For example, idler body 28 may be a cast component made from a material of suitable strength and durability commensurate with the intended operating environment such as, for example, a suitable ferrous alloy material. It should be understood, however, that other manufacturing processes and materials are possible. In some alternative embodiments, one or more of hub portion 30, central flange 34, and rim portion 36 may be formed separately and secured to each other to form idler body 28. Further, while shown as a solid component, it should be understood that one or more portions of idler body 28 (e.g., central flange 34) may be hollow.

Sound suppression device 26 may be installed on idler assembly 14 to reduce a level of noise that would otherwise be produced during operation of machine 10. As shown in FIGS. 2-3, a pair of sound suppression devices 26 may be disposed on opposing sides of idler body 28. In an exemplary embodiment, each sound suppression device 26 may include a pair of side plates 52, 54, a dampening member 56, and dampening material 58 (shown only in FIG. 2).

Side plates 52, 54 may be identical or similarly-sized members, each including substantially flat annular surfaces on opposing sides thereof, including an inner diameter approximately equal to the inner diameter of cavity 40 and an outer diameter approximately equal to the outer diameter of cavity 40. Side plates 52, 54 may be cast or forged steel, for example, although other materials are possible. For example, side plates 52, 54 may be cut from a steel sheet, aluminum sheet, other metallic alloys sheet, composites or polyurethane based polymeric sheet. Further, the side plates 52, 54 may be galvanized and/or PVC coated.

Dampening member 56 may include a pair of substantially flat annular surfaces, similar to side plates 52, 54. In an exemplary embodiment, dampening member 56 may include a thickness that is greater than that of side plates 52, 54. However, dampening member may have any desired thickness. Dampening member 56 may be made of a natural or a synthetic rubber, thermosetting plastics, composites, polymeric material or any other material having sound absorbing properties known in the art.

As illustrated in FIGS. 2-3, dampening member 56 may be disposed between side plates 52, 54 and secured to idler body 28. In an exemplary embodiment, side plates 52, 54 and dampening member 56 may be positioned to enclose at least a portion of cavity 40, such that a closed space is formed between a surface of inner side plate 52 and inner surface 38. For example, side plate 52 may be positioned on support flanges 50, with dampening member 56 and side plate 54 positioned thereon.

In some embodiments, side plates 52, 54 and dampening member 56 may be secured to each other, such as by adhesive bonding, ultrasonic welding, fasteners (e.g., bolts), or any other well-known method in the art. Side plates 52, 54 and dampening member 56 may be permanently or removably secured to idler body 28. In one embodiment, side plates 52, 54 may each be welded to idler body 28 at inner and outer diameters thereof, with dampening member 56 held in place therebetween.

In another embodiment, side plates 52, 54 and dampening member 56 may each include one or more holes configured to receive a fastener, such as a through bolt. In one example, the holes may be aligned with a hole in central flange 34 and holes in the components of a sound suppression device 26 located on an opposite side of idler body 28. In this way, a fastener may extend through two sound suppression devices 26 and idler body 28, with opposing ends thereof including members to secure the sound suppression devices 26 in place (e.g., threaded nuts). In another example, side plates 52, 54 and/or dampening member 56 may include a plurality of holes that align with holes (e.g., in support flanges 50) and receive fasteners for securing side plates 52, 54 to idler body 28.

In yet another embodiment, at least side plate 54 may be positioned in a pair of annular grooves located on outer portion 46 of hub portion 30 and inner portion 48 of rim portion 36, respectively, with a snap ring at least partially positioned in the annular grooves to frictionally hold side plate 54 (and thus dampening member 56 and side plate 52) in position on idler body 28.

In an exemplary embodiment, the closed space of cavity 40 may contain dampening material 58. In one embodiment, dampening material 58 may be a flowable fill material that assists in sound dampening idler assembly 14. For example, dampening material 58 may be sand, shot (e.g., steel shot, ceramic shot, etc.), tar, high viscosity dampening fluid, etc. Dampening material 58 may substantially fill cavity 40 such that dampening material 58 simultaneously contacts inner surface 38 and side plate 52. In particular, dampening material 58 may substantially fill cavity 40 such that dampening material 58 remains in contact with a surface of inner portion 48 of rim portion 36 during operation.

In an exemplary embodiment, one or more of side plates 52, 54, and dampening member 56 may include one or more features configured to allow dampening material 58 to be provided in cavity 40. For example, at least one of side plates 52, 54, and dampening member 56 may include a fill hole. In the embodiment of FIGS. 2-3, side plate 52 may include fill hole 60. Fill hole 60 may be sized and arranged such that dampening material 58 may be provided into and substantially fill cavity 40 while side plate 52 is attached to idler body 28 (e.g., via a hose). For example, fill hole 60 may be positioned near a center of side plate 52. In other embodiments, one or more of dampening member 56 and side plate 54 may also include a fill hole that aligns with fill hole 60, such that dampening material 58 can be provided into cavity 40 while side plate 52, dampening member 56, and side plate 54 are positioned on idler body 28. Dampening material 58 can be provided into cavity 40 through, for example, a pouring or injection technique. In some embodiments, a second hole may be formed to allow air to escape while cavity 40 is filled.

In some embodiments, a plug 62 may be configured to close off fill hole 60 such that dampening material 58 cannot escape cavity 40 through fill hole 60 during use. In the embodiment of FIGS. 2-3, plug 62 may be a flexible member configured to engage opposing sides of side plate 52. As shown, dampening member 56 may include a depression 64 configured to receive a portion of plug 62, thereby maintaining planar contact between side plate 52 and dampening member 56. In other embodiments, plug 62 may extend through all of side plates 52, 54 and dampening member 56, such as to engage an inner side of side plate 52 and an outer side of side plate 54. In some embodiments, plug 62 may be threaded. In other embodiments, plug 62 may be formed by fill hole 60 being closed by welding. Further, in embodiments in which an additional hole is included for venting air while filling, an additional plug may be used to close off the additional hole.

Figure 4:
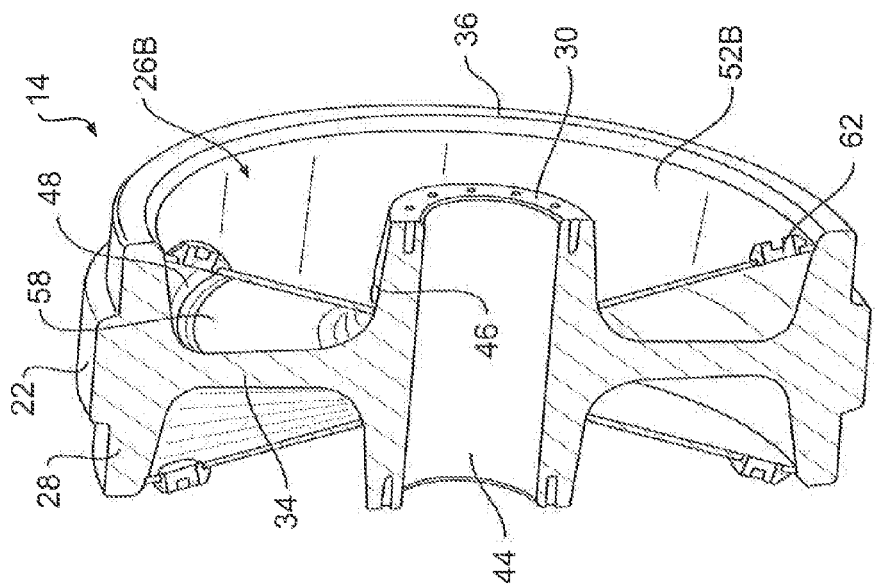
FIG. 4 illustrates a partial cross-sectional view in perspective of an idler wheel including a sound suppression device, according to an alternative disclosed embodiment.
Figure 5:
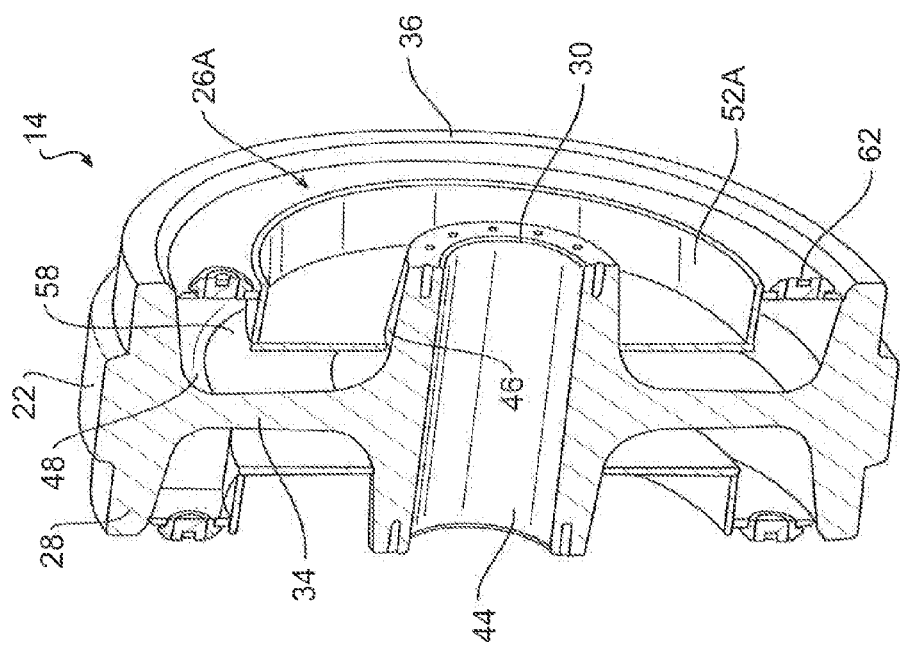
FIG. 5 illustrates a partial cross-sectional view in perspective of an idler wheel including a sound suppression device, according to another alternative disclosed embodiment.

FIGS. 4 and 5 depict exemplary alternative sound suppression devices 26A and 26B, respectively. Sound suppression devices 26A and 26B include components that are similar to those of sound suppression device 26, but may be shaped or configured differently. For example, sound suppression devices 26A, 26B may include side plates 52A, 52B, respectively, that include alternative shapes to side plate 52, such as to enclose only a particular portion of cavity 40 to form the closed space.

As shown in FIG. 4, side plate 52A may be Z-shaped such that a portion of side plate 52 follows inner surface 38 near hub portion 30 and juts out away from inner surface 38 prior to reaching rim portion 36. As shown in FIG. 5, side plate 52B may be cone-shaped (e.g., a shape similar to that of a Belleville washer), such that side plate 52B is connected closer to central flange 36 at the end connected to hub portion 30 than at the end connected to rim portion 36. In both sound suppression devices 26A, 26B, a larger portion of the closed space of cavity 40 is formed near rim portion 36, further promoting contact between dampening material 58 and rim portion 36. While FIGS. 4 and 5 depict only one side plate 52A or 52B, it should be understood that sound suppression devices 26A, 26B may include a dampening member (e.g., similar to dampening member 56) and a second side plate (e.g., similar to side plate 54).

The above described idler assembly 14 with sound suppression device 26 may operate in the same manner as idler assembly 14 without sound suppression device 26 installed. However, sound suppression device 26 may have significant vibrational dampening and sound absorbing effects, thereby reducing the level of noise produced by machine 10 during operation. An exemplary process for installing sound suppression device 26 is described in more detail below.

INDUSTRIAL APPLICABILITY

The disclosed sound suppression device may be applicable to reduce noise that would otherwise be produced by a traction assembly, such as an undercarriage assembly of a mobile machine. The disclosed sound suppression device may be particularly applicable to reduce noise associated with vibration and metal-on-metal contact associated with a wheel of an undercarriage assembly, such as an idler wheel. At least some embodiments of the disclosed sound suppression device includes a dual-dampening system, in which a dampening fill material absorbs vibration and sound by remaining in contact with the inner surfaces of an idler body, and a dampening member, separated from the dampening material by a plate, additionally helps to reduce vibration and sound, such as noise that would otherwise propagate through the sound suppression device (e.g., via a side plate retaining the fill material).

A process by which sound suppression device 26 may be installed on idler body 28 will now be described. It should be understood that, while the process describes the installation of one sound suppression device 26, a second sound suppression device 26 could be installed on the opposite side of idler body 28 in the same or a similar manner.

In one embodiment at least side plate 52 may be first secured to idler body 28. In other embodiments, dampening material 58 may be first provided in cavity 40. In an exemplary embodiment, side plates 52, 54, and dampening member 56 may be separately secured to idler body 28. Side plate 52 may be secured to idler body 28 by welding the inner and outer diameters thereof to inner surface 38 (e.g., at support flanges 50). Next, dampening material 58 may be provided through fill hole 60 into cavity 40. It should be understood, however, that in embodiments in which dampening member 56 and side plate 54 include fill holes that align with fill hole 60, two or three of side plates 52, 54 and dampening member 56 may be first secured to idler body 28 before dampening material 58 is inserted.

Dampening material 58 may be moved into cavity 40 by placing a fill member (e.g., hose) in fill hole 60 (if side plate 52 is first attached) and providing an amount of dampening material 58 into cavity 40. The amount may be predetermined (e.g., a calculated amount) or determined during filling (e.g., based on a gauge). As described herein, the amount of dampening material 58 may be enough to ensure dampening material 58 remains in at least partial contact with inner surface 38 and side plate 52 during operation.

After providing dampening material 58, fill hole 60 may be closed (or, in embodiments in which dampening material 58 is provided first, side plate 52 may be attached). For example, plug 62 may be inserted into fill hole 60. In other embodiments, fill hole 60 may be welded shut. After fill hole 60 is closed, the remaining of dampening member 56 and side plate 54 may be secured to idler body 28. In an exemplary embodiment, dampening member 56 may be placed on side plate 52, with depression 64 aligned with plug 62. Side plate 54 may then be placed over dampening member 56 and welded to idler body 28 to complete the installation.

In some embodiments, dampening member 56 may be attached (e.g., by adhesive) to side plate 52 and/or 54. In other embodiments, dampening member may be held only by the pressure of side plates 52, 54. Further, in embodiments in which side plates 52, 54 are secured to idler body 28 by a process other than welding, the above steps may be modified to accommodate the alternative means of fastening (e.g., aligning holes for receiving fasteners, installing a snap ring, etc.).

After a sound suppression device 26 is installed on one or both sides of idler body 28, idler assembly 14 may be ready for operation with machine 10 and track assembly 12. As machine 10 operates, the sound-dampened idler assembly 14 may operate as it normally would. However, sound suppression device 26 may substantially reduce noise created by track assembly 12 by utilizing multiple dampening materials to absorb sound and vibration. For example, filling the cavities 40 of idler body 28 with a dampening material 58 absorbs a substantial degree of vibration, while disposing an additional dampening member 56 further attenuates vibration that would otherwise be conducted through the assembly. Further, the use of a flowable dampening material 58 allows sound suppression device 26 to be low-cost and easily installed.

It will be apparent to those skilled in the art that various modifications and variations can be made to the sound suppressed idler wheel assembly of the present disclosure without departing from the scope of the disclosure. For example, in some embodiments, dampening member 56 and/or one of side plates 52, 54 may be omitted. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. An idler wheel assembly for a mobile machine, comprising:
   an idler body defining a cavity between a hub portion and a rim portion; and
   a sound suppression device, including:
      a first side plate attached to the idler body and enclosing at least a portion of the cavity to form a closed space;
      a second side plate attached to the idler body;
      a dampening member disposed between the first side plate and the second side plate; and
      dampening material positioned inside the closed space and in contact with a surface of an inner portion of the rim portion.

2. The idler wheel assembly of claim 1, wherein the dampening material is a flowable material configured to be provided into the closed space while the first side plate is attached to the idler body.

3. The idler wheel assembly of claim 2, wherein the dampening material is one or more of sand, shot, tar, or high viscosity damping fluid.

4. The idler wheel assembly of claim 1, wherein the first side plate includes a fill hole configured to receive the dampening material therethrough.

5. The idler wheel assembly of claim 4, further including a plug closing the fill hole.

6. The idler wheel assembly of claim 5, wherein the dampening member includes a depression configured to receive at least a portion of the plug.

7. The idler wheel assembly of claim 5, wherein the dampening member and the second side plate each include fill holes aligned with the fill hole of the first side plate.

8. The idler wheel assembly of claim 4, wherein the first side plate further includes an additional hole configured to vent air while the dampening material is provided into the closed space.

9. The idler wheel assembly of claim 1, wherein first side plate and the second side plate are welded to the idler body.

10. The idler wheel assembly of claim 1, further including a pair of grooves formed in the idler body, the pair of grooves configured to receive at least the second side plate and a snap ring configured to frictionally hold the first side plate, dampening member, and second side plate in position.

11. The idler wheel assembly of claim 1, further including a pair of support flanges formed on the idler body, the first side plate supported on the pair of support flanges.

12. The idler wheel assembly of claim 1, wherein at least the first side plate is Z-shaped such that a larger portion of the closed space is near the rim portion.

13. The idler wheel assembly of claim 1, wherein at least the first side plate is cone-shaped such that a larger portion of the closed space is near the rim portion.

14. A method of installing a sound suppression device on an idler wheel, the idler wheel including an idler body defining a cavity between a hub portion and a rim portion, the method comprising:
   providing a dampening material to fill at least a portion of the cavity;
   attaching a first side plate to the idler body to enclose at least a portion of the cavity to form a closed space;
   positioning a dampening member on a side of the first side plate opposite from the closed space; and
   attaching a second side plate to the idler body such that the dampening member is disposed between the first side plate and the second side plate.

15. The method of claim 14, wherein attaching the first side plate and attaching the second side plate includes welding the first and second side plates to the idler body.

16. The method of claim 14, wherein:
   the first side plate is attached to the idler body before the dampening material is provided into the cavity,
   the first side plate includes a fill hole, and
   the dampening material is provided into the closed space of the cavity through the fill hole.

17. The method of claim 16, farther including inserting a plug into the fill hole to close the fill hole.

18. The method of claim 14, wherein the dampening material is provided into the cavity before the first side plate is attached to the idler body.

19. The method of claim 14, wherein the dampening member and the second side plate each include fill holes that are aligned with the fill hole of the first side plate, and the dampening material is provided into the closed space through the aligned fill holes.

20. An idler wheel assembly for a mobile machine, comprising:
   an idler body defining a cavity between a hub portion and a rim portion; and
   a sound suppression device, including:
      a first side plate welded to the idler body and enclosing at least a portion of the cavity to form a closed space, the first side plate including a fill hole;
      a second side plate welded to the idler body;
      a dampening member disposed between the first side plate and the second side plate; and
      dampening material positioned inside the closed space and in contact with a surface of an inner portion of the rim portion,
   wherein the dampening material is a flowable material configured to be provided through the fill hole into the closed space while the first side plate is attached to the idler body.

* * * * *